J. CLARK.
NUT LOCK.
APPLICATION FILED JAN. 23, 1911.
1,020,026.
Patented Mar. 12, 1912.
FIG: 1.
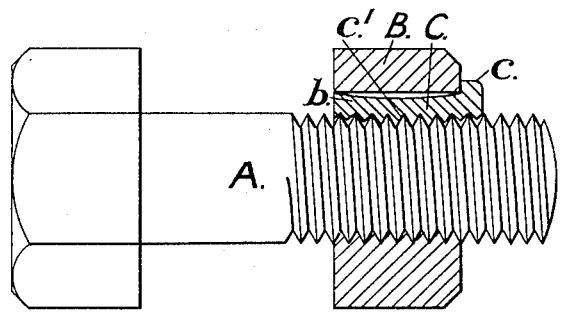
FIG: 2.
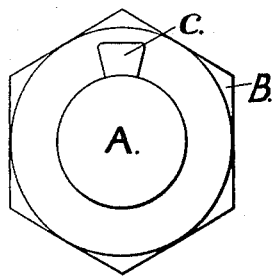
FIG: 3.
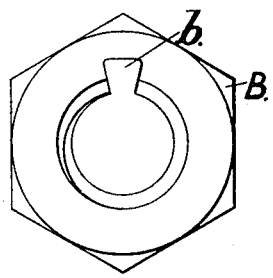
FIG: 4.
Witnesses
Inventor

UNITED STATES PATENT OFFICE.

JOHN CLARK, OF SYDENHAM, ENGLAND.

NUT-LOCK.

1,020,026.  Specification of Letters Patent.  Patented Mar. 12, 1912.

Application filed January 23, 1911. Serial No. 604,187.

*To all whom it may concern:*

Be it known that I, JOHN CLARK, retired officer H. M. Customs, of Lilian Cottage, Burghill Road, Sydenham, in the county of Kent, England, citizen of Great Britain, have invented a new and useful Nut-Lock, of which the following is a specification.

My invention relates to improvement in nut-locks and has for its chief object to construct a simple and efficient arrangement which will securely retain a nut in any adjusted position upon a bolt and will prevent the nut from working loose when subjected to the effects of continued or excessive vibration.

According to this invention the nut-lock comprises a nut slotted internally throughout its length and containing a spring tempered key which is formed on one face with teeth or serrations corresponding in pitch to the pitch of the screw threads in the nut or bolt and adapted to be forced into spring contact with the threads upon the complementary part of the nut-lock during the operation of screwing the nut upon the bolt.

In order that my said invention may be clearly understood and readily carried into effect I will describe the same more fully with reference to the accompanying drawings in which:—

Figure 1 is an elevation of a bolt showing the nut and key in section. Fig. 2 is an elevation of Fig. 1. Fig. 3 is an end elevation of the nut, and Fig. 4 is an elevation of the key drawn to a larger scale.

A, represents the bolt, B, the nut and C, the key. The nut is formed with a slot $b$ which extends throughout its length for the reception of the aforesaid key C and may be dovetailed as shown or be otherwise shaped for preventing displacement of the key in a direction toward the center of the nut. The key is formed with a head such as $c$ to facilitate the holding of the key in position within the nut as the latter is being placed on the bolt.

$c^1$ indicates the above mentioned serrations or teeth that are formed upon the face of the key that bears against the bolt. In order to cause the said teeth to be pressed firmly against the corresponding threads on the bolt as the nut is being screwed thereon the key is advantageously curved somewhat in the manner indicated in Fig. 4. This results in the key being straightened out to a considerable extent when the nut is screwed upon the bolt and causes the majority of the teeth upon such key to be forced into intimate contact with the threads on the bolt as shown in Fig. 1.

It will be obvious that the nut lock hereinbefore described can be used in connection with any form of screwed work to which a nut can ordinarily be applied.

Having now particularly described and ascertained the nature of my said invention and in what manner the same is to be performed I declare that I claim—

1. The combination of two coöperating screw threaded members, one of such members being provided with a groove across the threads in parallelism with the axis of the member, a locking member adapted to be received in said groove and being bent longitudinally toward the other member and adapted to project out of said groove into the path of movement of the complementary screw threaded member.

2. The combination of two coöperating screw threaded members, one of such members being provided with a groove across the threads in parallelism with the axis of the member, a locking member adapted to be received in said groove and being bent longitudinally toward the other member, said locking member being adapted to project out of said groove into the path of movement of the complementary screw threaded member and having teeth to engage the threads of the said complementary member.

3. The combination of two coöperating screw threaded members, one of such members being provided with a dovetailed groove across the threads in parallelism with the axis of the member, a locking member adapted to be received in said groove and being bent longitudinally toward the other member and adapted to project out of said groove into the path of movement of the complementary screw threaded member.

JOHN CLARK.

Signed in the presence of—
C. P. LIDDON,
HUBERT D. JAMESON.

Copies of this patent may be obtained for five cents each, by addressing the "Commissioner of Patents, Washington, D. C."